Feb. 7, 1950  R. C. RUSSELL  2,496,497
BRAKE
Filed Aug. 16, 1946  2 Sheets-Sheet 2
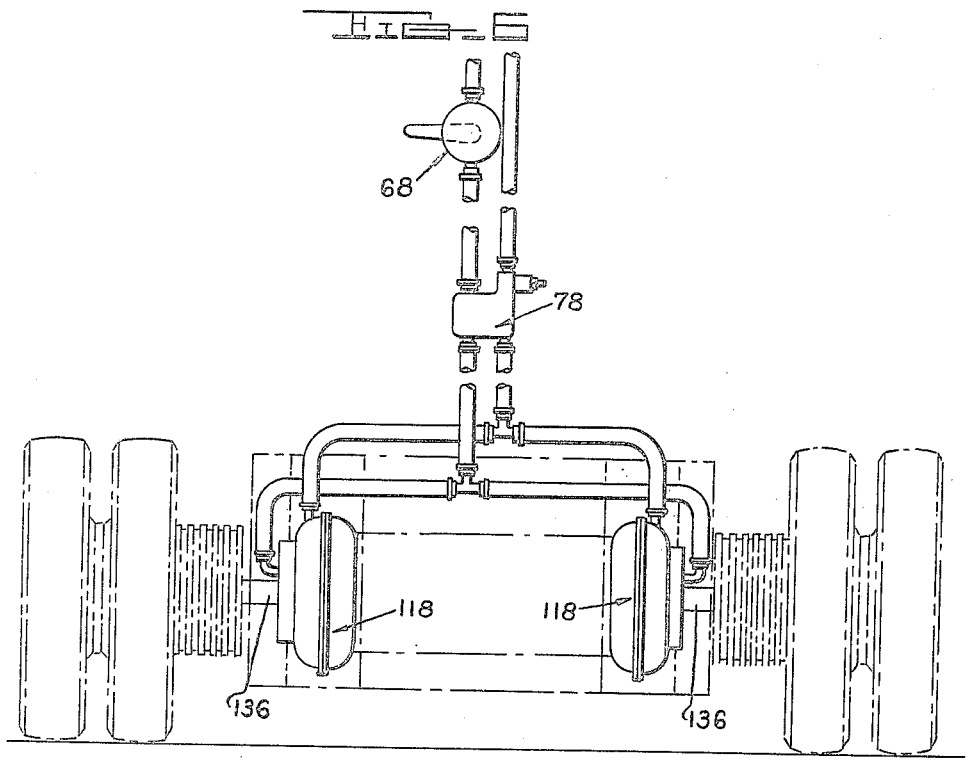
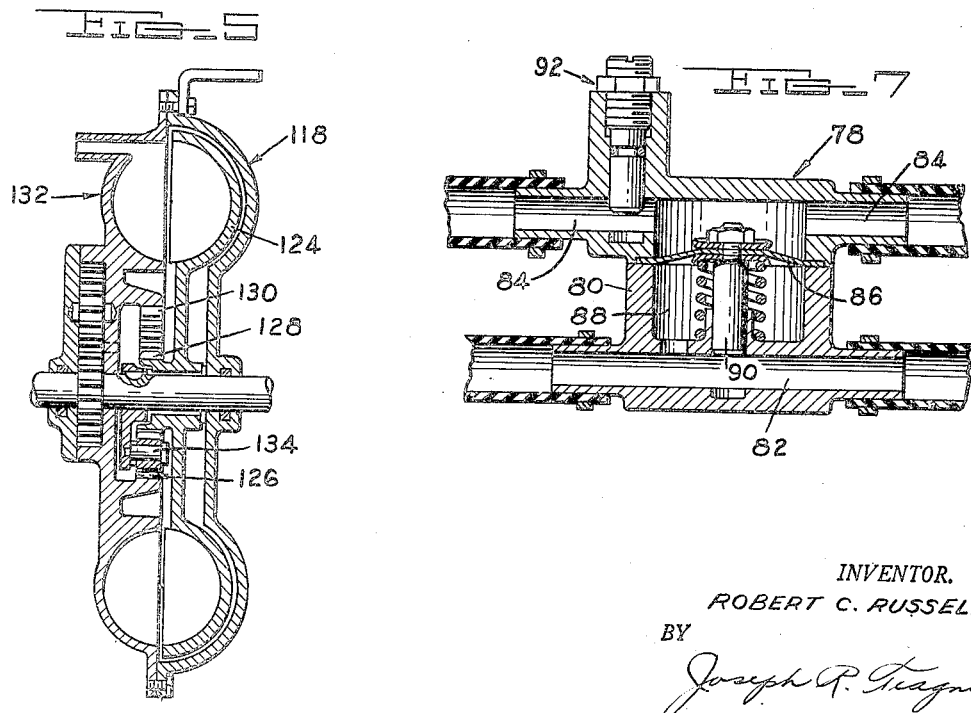
INVENTOR.
ROBERT C. RUSSELL
BY Joseph P. Tiagno
ATTORNEY Patented Feb. 7, 1950

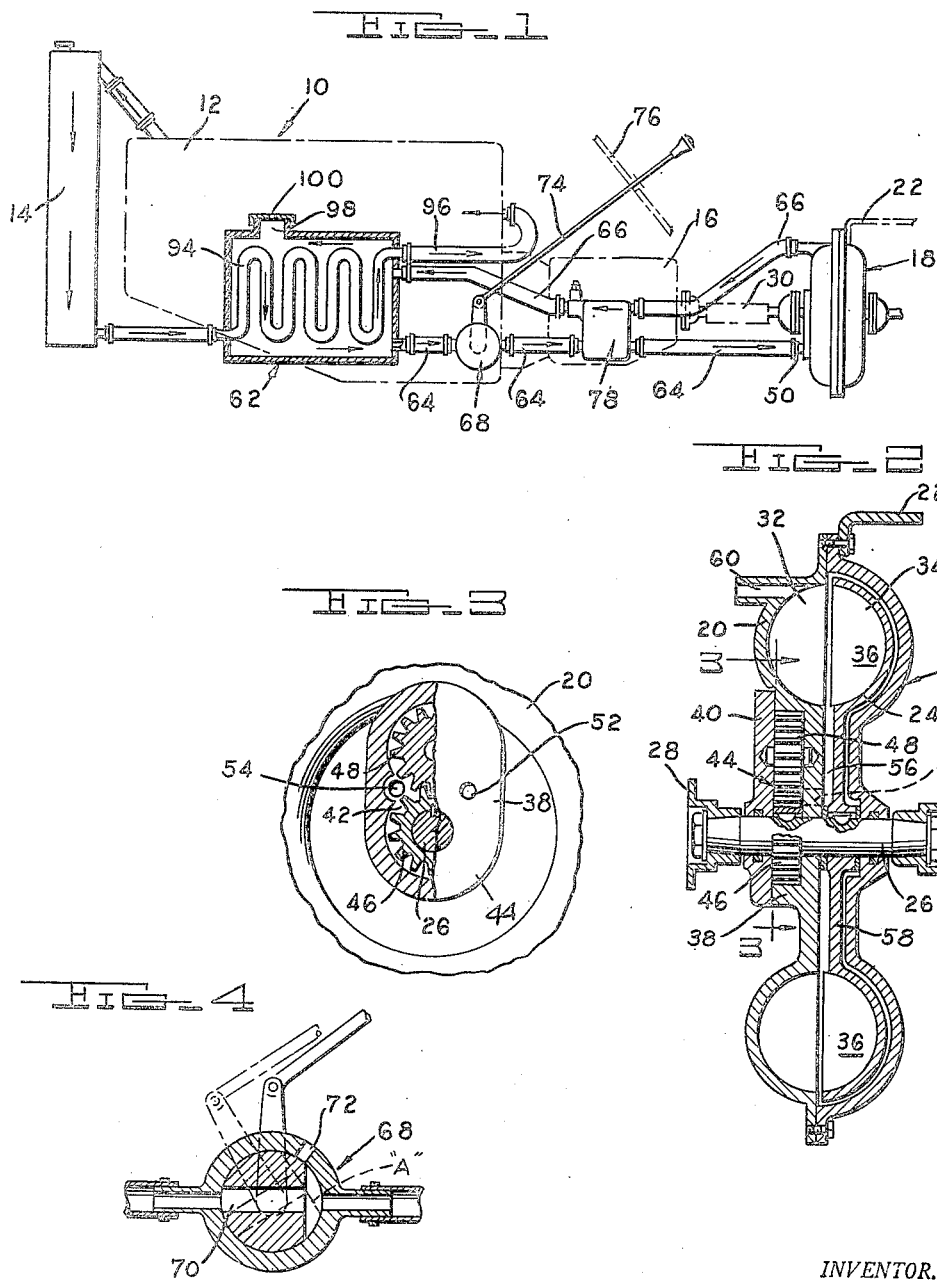

2,496,497

UNITED STATES PATENT OFFICE 2,496,497

BRAKE

Robert C. Russell, Cleveland Heights, Ohio

Application August 16, 1946, Serial No. 690,845

5 Claims. (Cl. 188—90)

This invention relates to motor vehicles and more particularly to retarding or auxiliary braking means therefor.

Broadly the invention comprehends the provision of a fluid friction or hydrodynamic braking system as an auxiliary to standard braking systems of motor vehicles adapted to assist the braking action of standard systems as well as prolong the life thereof.

An object of the invention is the provision of a compact and effective fluid friction brake.

Another object of the invention is the provision of a fluid friction brake for motor vehicles having control means therefor operative to automatically limit the maximum braking torque so as not to impose excessive loads on driving parts of the vehicle.

Another object of the invention is the provision of a braking system for a motor vehicle including a fluid friction brake having an independent fluid supply and circulating system and wherein the cooling liquid circulating system of the vehicle is associated with the fluid supply of the brake effective to provide for the cooling thereof.

A further object of the invention is the provision of a fluid friction brake system having gear speed-up means adapting said brake to relatively low speed rotating members such as motor vehicle wheel shafts.

A yet further object of the invention is the provision of a fluid friction brake system wherein the pump for the brake is integrally built into the brake unit so as to positively provide for the filling of the fluid cavity of the brake.

And still a further object of the invention is the provision of a hydrodynamic braking system as an auxiliary to, but independent of, conventional friction braking means for motor vehicles.

Other objects and advantages of the invention will appear from the following description taken in connection with the drawings, forming a part of the specification; and in which:

Fig. 1 is a top plan, partially sectionalized view of an engine of split cylinder construction comprising a pair of cylinders bolted together;

Fig. 2 is a vertical cross-sectional view of the fluid friction brake, per se;

Fig. 3 is a fragmentary cross-sectional view taken substantially along line 3—3 of Fig. 2;

Fig. 4 is a vertical cross-sectional view of the fluid supply control valve for the system of Fig. 1 and Fig. 6;

Fig. 5 is a vertical cross-sectional view of a modified form of fluid friction brake;

Fig. 6 is a fragmentary top plan view of an application of the modified fluid friction brakes to the wheel shafts of a motor vehicle; and Fig. 7 is a vertical cross-sectional view of the pressure regulator valve for the systems shown by Figs. 1 and 6.

With the advent of cross-country or long-haul transportation by motor vehicles, such as, trucks and busses carrying heavy pay loads, it has become essentially important to provide auxiliary braking means to the conventional type of air or hydraulic operated friction braking means employed by said vehicles. These auxiliary brakes have generally taken the form of fluid friction or hydrodynamic braking means effective to retard the motion of heavy moving vehicles before necessity to apply the conventional brakes to bring said vehicles to a stop, thereby prolonging the life of the friction braking system while at the same time causing an appreciably little or no wear to the friction brake parts. Furthermore, as in the case of descending long or high grades, the fluid friction brake is ample and capable in and of itself to retard or brake the motion of the vehicle with which it is associated effective to slow the vehicle down, wherein a positive stop is not required, without the need for application of the conventional brake system.

The instant invention, while directed to the general type of fluid friction brake, incorporates in the design and control thereof features permitting of more effective operation and control of fluid friction brakes than has heretofore been possible.

The present fluid friction brake structure consists of a fluid friction brake, per se, comprising a stationary bladed member and an associated rotating bladed member driven from the drive shaft or wheel shaft of a vehicle as the case may be, a fluid supply or storage tank, a suitable manually operated valve for controlling the fluid supply to the brake, and an automatic pressure regulator valve adapted to establish the maximum pressure to be developed by the brake. The brake, per se, includes as an integral and important part thereof a gear pump housed in the stationary bladed member and driven from the shaft upon which the braking force is to be applied effective to deliver the pumped fluid, when so admitted thereto by the fluid supply control valve, directly into the torus cavity formed between the stationary and rotating bladed members. The pressure regulator valve affords an important structural feature of this system in that the pressure is effectively regulated in the brake, per se, so as not to exceed a predetermined allowable amount and thus prevent the imposition of excessive loads on the various driving parts of the vehicle.

Referring to the drawings for more specific details of the invention wherein like numerals refer to like parts throughout the drawings, 10 represents generally the driving mechanism of an automotive vehicle comprising an engine or power plant 12, an engine radiator 14 and a gear transmission box or housing 16.

A hydrodynamic brake or fluid friction brake 18 constituting the basis of the invention comprises a housing 20 mounted in stationary fixed relation upon a frame member 22 of the associated vehicle, not shown, and a rotor 24 mounted upon and driven by a shaft 26 adapted to be fixedly secured by flange 28 keyed on the shaft to a driving or propeller shaft 30 forming a part of the gear train of the gear system driven from the transmission disposed in the gear box 16, said shaft being directly connected to a member of the transmission extending through and beyond the gear box. The housing 20 and rotor 24 are each provided with cooperating radial blades 32 and 34 respectively arranged in a torus cavity 36 such as the general arrangement of blades in cooperating impeller and turbine members of a conventional fluid coupling.

The housing 20 provides in the hub 38 thereof in conjunction with a cover plate 40 mounted thereon a pump chamber 42 for the reception of a gear pump 44 consisting of a pair of meshing gears, one gear 46 splined for rotation with shaft 26 about its axis and a gear 48 journalled in the housing 20 for rotation about its own axis. The pump chamber 42 communicates with a fluid supply inlet 50 through a port 52 in the cover plate 40 and communicates through a discharge opening 54 in housing 20 and radial passage 56 formed between housing 20 and a hub 58 of rotor 24 with the torus cavity 36, said torus cavity in turn having an outlet port 60 formed at the outer diameter of the housing 20.

The brake 18 which is adapted to retard or brake the motion of propeller shaft 30 for the purpose of retarding the vehicle to be driven therefrom, is supplied braking fluid from a fluid supply contained in a cooling tank 62 arranged in some suitable place in the vehicle and preferably as shown by Fig. 1 adjacent the vehicle engine. The tank has outlet and inlet conduits 64 and 66 connected respectively with the inlet to pump 44 and outlet of the torus cavity 36.

The supply of fluid from tank 62 to pump 44 is appropriately controlled by a manually actuated valve 68 arranged in conduit 64, said valve having a passageway 70 adapted, as shown in full lines by Fig. 4, to provide free flow of fluid therethrough from tank 62 to pump 44 but effective upon manipulation to the position "A," shown in dotted lines, to prevent passage of fluid from the tank while at the same time uncovering air passage 72 in the wall of the valve housing so as to permit full exhausting of fluid from the torus cavity 36 of the brake through the pumping action of pump 44 drawing air through passage 72 and thence through conduit 64 connected to the pump inlet. The valve 68 is adapted to be actuated by any appropriate means such as lever 74 arranged upon the dash 76 of the vehicle.

As a means of automatically controlling the maximum predetermined pressure to be developed in the brake, a regulator valve 78 is interposed in the conduits 64 and 66 and comprises a valve body 80 having parallel arranged passages 82 and 84 therethrough connected respectively in lineal flow relationship to conduits 64 and 66. The passages are separated from communication by a spring pressed diaphragm 86 arranged in a chamber 88 formed between the passages 82 and 84 and is acted upon opposite sides thereof by fluid pressure in the passages. The diaphragm 86 supports a plunger 90 which is adapted to restrict the flow through passage 82 upon actuation of the diaphragm from its normal position. The passage 84 which is arranged in the discharge from the brake is restricted by an adjustable plug 92 threaded in the body of the valve, said plug being adjustable to the pressure desired to be developed in the brake.

The tank 62 providing the fluid supply for the brake has arranged therein a water circulating coil 94 adapted to be connected in the supply line of the cooling radiator of the engine between the radiator and engine such that the water which has been circulated through the radiator and cooled thereby is fed directly into the coil 94 for the purpose of cooling the fluid to be used in the brake, and thence from coil 94 through conduit 64 to the engine, thereby providing a complete cycle of fluid flow from engine to radiator, radiator to cooling coil in tank, and thence, cooling coil to engine. Fluid is supplied to tank through an opening 98 in the top thereof, closed as by a cap 100.

In a normal operation of the brake 18 wherein a driving force is being transmitted from propeller shaft 30 through shaft 26 to the drive wheels of the vehicle, not shown, and when it is desired to retard or brake the moving force of the vehicle, the valve 68 is moved to the full line position of Fig. 4 resulting in permitting passage of fluid freely through conduit 64. Upon the free passage of fluid to the inlet of pump 44, the pump which has been in continual rotative operation during the rotation of propeller shaft 30 operates to deliver fluid to the torus cavity between the blades 32 and 34, said fluid tending to place a drag upon blades 34 because of the stationary relation of blades 32 thereto. As more fluid is supplied from the pump to the torus cavity, the previously delivered fluid is discharged through the outlet port 60 to conduit 66 back to the tank. As the fluid under pressure passes through passage 84 of valve 78, it acts upon the diaphragm 86 causing the diaphragm to be moved in the event the pressure in passage 84 exceeds the predetermined safe pressure permitted. With the movement of diaphragm 86, if the pressure is excessive, the plunger 90 moves into the passage 82 acting to restrict the flow of fluid therethrough thus automatically acting to compensate through the pump 44 and cavity 36 to lower the pressure in passage 84 and thereby restore the regulator valve to normal position and the braking pressure to a predetermined maximum. Through this actuation of the regulator valve the maximum braking torque of the brake 18 is limited thus preventing an overbraking thereof. When the required braking or retarding effect is completed and it is no longer further necessary to retard or brake the vehicle, the valve 68 is moved to dotted line position "A" resulting in inhibiting further flow of fluid from the tank to the pump, said pump in the meantime continuing to function through the rotation thereof as imparted by shaft 26 effective by way of intaking air through air intake passage 72 to completely exhaust the fluid from the torus chamber or cavity 36 through the conduit 66 and regulator valve passage 84 to tank 62. With the exhausting of torus cavity 36 the rotor is free to rotate independent of the blades 32 and housing 20. This completes a cycle of operation of the brake 18 and its associated members.

Figs. 5 and 6 illustrate a further application of a fluid brake, this time as applied to the slow moving axles or wheel shafts of a truck or trailer wherein a brake 118 differs from brake 18 only in the provision of a planetary gear system 126 for the purpose of stepping up the speed of rotor 124 over the speed of the input shaft. The planetary gear system 126 includes a sun gear 128 formed as part of rotor 124, a ring gear 130 formed as a part of stationary housing 132, and a series of planet pinions 134 mounted for rotation upon a plate fixedly secured to the input shaft, said pinions providing gear meshing relation between the ring and sun gears.

The brakes 118 are adapted to be mounted in pairs, one upon each of the axles 136 of the vehicle with which associated, and controlled as through valves 68 and 78 common to both brakes.

The brakes 118 function in all respects similarly to brake 18 with the exception of the speed-up feature of rotor 124 relative to rotor 24 of brake 18 such that an effective retarding or braking of the axle shafts can be accomplished irregardless of their speed.

While this invention has been described in connection with certain specific embodiments, the principle involved is susceptible of numerous other applications that will readily occur to persons skilled in the art. The invention, therefore, is limited only as indicated by the scope of the appended claims.

What I claim is:

1. A braking system for a vehicle comprising a fluid friction brake including a rotor driven from a driving shaft of the vehicle engine and a stator cooperable with the rotor, a fluid supply for the brake, a fluid circulating system associated with the brake and supply including supply and return conduits extended therebetween, a manually actuated valve in the supply conduit of the circulating system for controlling the fluid supply to the brake, a pumping means associated between the stator and driving shaft in the supply conduit at the intake to the brake between the rotor and stator for circulating fluid through the brake, circulating system, and supply, and an automatically responsive pressure regulator in the circulating system arranged between the supply and return conduits for limiting to a predetermined amount the braking force of the brake regardless of driving shaft speed or the position of manual control means.

2. A braking system for a vehicle comprising a fluid friction brake having a stationary bladed member and a rotatable bladed member cooperable therewith, said rotatable member being geared to an output or driving shaft of the vehicle, a fluid supply and circulating system for the brake including supply and return conduits interconnecting the fluid supply and brake, a fluid pump driven from the output shaft mounted between the stationary member and output shaft for delivering fluid from the supply system directly into the brake between the rotatable and stationary bladed members thereof, manual means in the supply conduit for controlling the supply of fluid delivered by the pump, automatic means for regulating the predetermined maximum amount of pressure to be developed in the brake comprising a fluid pressure actuated diaphragm interposed between the supply and return conduits intermediate the fluid supply and brake, and a heat exchanger associated with the fluid supply and circulating system for cooling the fluid circulated through the brake.

3. A braking system for a motor vehicle provided with a propeller shaft and a cooling fluid circulating system including a heat exchange radiator, a fluid brake comprising a stationary bladed member and a rotatable bladed member cooperable therewith driven from the propeller shaft, a cooling fluid circulating system for the brake including a fluid supply or storage tank, a portion of the engine cooling fluid circulating system being disposed in the storage tank effective to operate as a heat exchange radiator therefor, a manually operable valve in the circulating system of the brake controlling the fluid supply to the brake, an automatically operable valve in the circulating system of the valve for controlling the maximum braking torque permissible by the brake, and a pump in the fluid circulating system for the brake driven from the propeller shaft and housed within the stationary member of the brake for delivering fluid to a point between the stationary and rotatable bladed members of the brake.

4. A braking system for a motor vehicle having a driving member, a fluid friction brake comprising a stationary bladed member and rotatable bladed member cooperable therewith and providing a torus cavity therebetween, said rotatable member being directly driven by the driving member of the vehicle, a cooling fluid circulating system for the brake including inlet and outlet conduits from the brake and a storage tank between the conduits, means in the inlet conduit for controlling the fluid supplied to the brake, means incorporated between the conduits intermediate the fluid supply control and brake for regulating the maximum pressure to be permissibly developed in the inlet conduit for delivery to the brake, and pump means in the inlet conduit at the inlet side to the brake intermediate the pressure regulator and brake for delivering fluid to the brake cavity or emptying fluid from the brake cavity when the supply means are shut off.

5. A braking system for a motor vehicle having a driving member, a fluid friction brake comprising a stationary bladed member and rotatable bladed member cooperable therewith and providing a torus cavity therebetween, said rotatable member being geared to the driving member of the vehicle to be driven at a multiple speed ratio relative thereto, a cooling fluid circulating system for the brake including inlet and outlet conduits from the brake and a storage tank between the conduits, means in the storage tank for extracting heat from the fluid circulated therethrough, means in the inlet conduit for controlling the fluid supplied to the brake, means incorporated between the conduits for regulating the maximum pressure to be permissibly developed in the brake, and gear pump means in the inlet conduit at the inlet side to the brake for delivering fluid to the brake cavity or emptying fluid from the brake cavity when the supply means are shut off comprising a gear member secured to the driving member of the vehicle associated with the rotatable member and a gear intermeshing with the first gear rotatably mounted in the stationary bladed member.

ROBERT C. RUSSELL.

(References on following page)

REFERENCES CITED

The following references are of record in the file of this patent:

UNITED STATES PATENTS

| Number | Name | Date |
|---|---|---|
| 765,026 | Mason | July 12, 1904 |
| 832,081 | Reeve et al. | Oct. 2, 1906 |
| 1,915,547 | North et al. | June 27, 1933 |
| 2,162,541 | Walker | June 13, 1939 |
| 2,170,128 | De La Mater | Aug. 22, 1939 |
| 2,241,189 | Dick | May 6, 1941 |
| 2,287,130 | Ramey | June 23, 1942 |